United States Patent [19]

Bluethman et al.

[11] 3,772,655

[45] Nov. 13, 1973

[54] METHOD OF OBTAINING CORRESPONDENCE BETWEEN MEMORY AND OUTPUT

[75] Inventors: Robert G. Bluethman; Randell L. James, both of Austin, Tex.

[73] Assignee: International Business Machines Corporation, Armonk, N.Y.

[22] Filed: Feb. 28, 1972

[21] Appl. No.: 229,998

[52] U.S. Cl. .............................................. 340/172.5
[51] Int. Cl. .............................................. G06f 3/10
[58] Field of Search .................................. 340/172.5

[56] References Cited

UNITED STATES PATENTS

| | | | |
|---|---|---|---|
| 3,573,735 | 4/1971 | Clark | 340/172.5 |
| 3,648,251 | 3/1972 | Serracchioli et al. | 340/172.5 |
| 3,618,032 | 11/1971 | Goldsberry et al. | 340/172.5 |
| 3,602,893 | 8/1971 | Hodges | 340/172.5 |
| 3,577,127 | 5/1971 | Bishop et al. | 340/172.5 |
| 3,579,193 | 5/1971 | Bernler | 340/172.5 |
| 3,544,975 | 12/1970 | Hunter | 340/172.5 |
| 3,553,445 | 1/1971 | Hernandez | 340/172.5 |
| 3,599,177 | 8/1971 | Uen et al. | 340/172.5 |

*Primary Examiner*—Paul J. Henon
*Assistant Examiner*—Mark Edward Nusbaum
*Attorney*—James H. Barksdale, Jr. et al.

[57] ABSTRACT

A method for sequentially obtaining an exact point-to-point correspondence between output and memory. The memory will automatically be rearranged in accordance with line length and/or format determinations. The system is comprised of an electronic dynamic shift register and associated control logic, and an input/output device. Control codes stored in the shift register along with text data codes determine the initial format. This format is altered and at the completion of output the memory will correspond to the output. For example, if a stored line length is 100 units defined by carrier return codes and the measure set on an output printer is 80 units, the memory will not correspond to the printed output. With the system of this invention, during an output operation a carrier return code will be inserted into memory at a point in the line less than 80 units from the line beginning and the carrier return code in memory defining the original 100 unit line will be removed.

2 Claims, 13 Drawing Figures

METHOD OF OBTAINING CORRESPONDENCE BETWEEN MEMORY AND OUTPUT

CROSS-REFERENCES TO RELATED APPLICATIONS

U.S. patent application, Ser. No. 104,888, filed Jan. 8, 1971, entitled "No Clock Shift Register and Control Technique," now U.S. Pat. No. 3,675,216, issued July 4, 1972 having R. L. James as inventor.

U.S. patent application, Ser. No. 158,346, filed June 30, 1971, entitled "Machine Log System," having F. T. May as inventor.

U.S. patent application, Ser. No. 158,347, filed June 30, 1971, entitled "Data Flow in a Machine Log System," having R. D. Lindsey et al. as inventors.

U.S. patent application, Ser. No. 194,418, filed Nov. 1, 1971, entitled "System for Merging Data Flow," having R. G. Bluethman et al. as inventors.

U.S. patent application, Ser. No. 214,370, filed Dec. 30, 1971, entitled "System for Arranging and Sharing Shift Register Memory," having R. D. Lindsey et al. as inventors.

U.S. patent application, Ser. No. 214,369, filed Dec. 30, 1971, entitled "System for Performing Multiple Operations," having R. G. Bluethman as inventor.

U.S. patent application, Ser. No. 222,513, filed Feb. 2, 1972, entitled "System for Revision Line Retrieval," having J. C. Greek et al. as inventors (AT9–71–010).

BACKGROUND OF THE INVENTION

1. Field of the Invention

This invention relates to printing and editing systems in general, and more specifically to a system for obtaining correspondence between memory and output during output and revision operations.

2. Description of the Prior Art

Heretofore, the area of code conversion (rearrangement of data and control codes) during output has been fraught with tape handling and time consuming problems. For example, representative of the closest known prior art is the IBM Magnetic Tape "Selectric" Trademark, International Business Machines Corporation Typewriter having two tape stations, playout/adjust capabilities, and line return capabilities. With the MT/ST, output in the adjust mode occurs simultaneously with the transfer of codes from a first tape to a second tape. During this transfer the arrangement of the control and data codes is changed to conform to the output format. Also, revisions in terms of insertion, deletions, etc. are recorded on the second tape. When output is interrupted for a revision operation, a number of situations can arise depending on the type of revision operation to be performed. For example, if material is to be added, the operator keys the new material and it is recorded on the second tape. This in effect is an insert operation and the operator must keep account of the right margin for properly entering a carrier return. Otherwise, there will be an underrun or overrun of the measure. When this occurs a second revision and/or transfer operation is in order. This is easily accomplished but the original hard copy will be ruined. One way this is accomplished is by performing a line return operation and outputting the line again to the point of revision. Another is through a backspace and write-over operation. In either event the error must be detected before output is continued, i.e., before the transfer operation is resumed. If the error is detected later, a second transfer operation is required for rearranging the codes to conform to the output measure.

As pointed out, tape handling, transfer, and print-out are time consuming and these problems are amplified as the number of errors increase. Therefore, there has been no rapid and efficient means for obtaining stored text which conforms to a desired output format. Also, exact correspondence between the stored text and printed output is not always possible when during a revision operation a delete and rewrite operation is performed. More text may have been deleted than is rewritten and blank blocks or delete codes can exist on the second tape. This will occur when inserted text is to be revised and the revision involves deleting intermediate parts of the inserted text.

SUMMARY OF THE INVENTION

The aforementioned problems are overcome through the use of a system having a buffer and associated input and output device. In the preferred embodiment the buffer, which is a dynamic shift register, is in electronic association with a bulk store and an input/output typewriter. When the shift register has been loaded with data and control codes and an output operation is initiated, the memory is rearranged simultaneously with output. Revisions performed when output is interrupted also affect the rearrangement of memory. The rearrangement of memory will be in accordance with a selected line length determination and/or format. For a selected measure, stored lines will be adjusted for ending within permissible boundaries. That is, control and data codes are automatically input, inserted, and deleted in accordance with output requirements. For example, for the data flow — (DUMMY) (RECORD) (x) (x) (x) (CARRIER RETURN) (x) (x) (x) CARRIER (CARRIER (x) (x) (x) (CARRIER RETURN) (x) (OPERATION) (x) (x) (CARRIER RETURN) (x) (x) (DUMMY) —if a carrier return code is encountered intermediate the left and right margins during output, it is deleted or replaced with a space code. Also, a new carrier return code is inserted into the data flow prior to the end of the measure for the next line if the measure is not to be overrun. A similar situation is involved when a discretionary (syllable) hyphen is detected intermediate the left and right margins. It is also deleted or replaced with a space.

When the output operation is terminated, the data stored in the shift register will have been revised and rearranged. That is, the memory will be arranged at the end of an output operation as though it had been keyed and stored initially in accordance with the desired output format. Further, when the stored text is to be revised, tape handling and transfer are not involved. In effect, a single storage means is involved which can be expanded or contracted for insertion and deletion. Also, as far as revision operations are concerned, the point in time is immaterial since a particular tape is not involved. Continued and random updating is therefore possible due to the use of this expandable storage means.

With the system of this invention, the data is to be packed and after delete codes resulting from a revision operation have been removed from memory, an exact correspondence between memory and output is obtained.

DESCRIPTION OF THE PREFERRED EMBODIMENT

Figure 1:
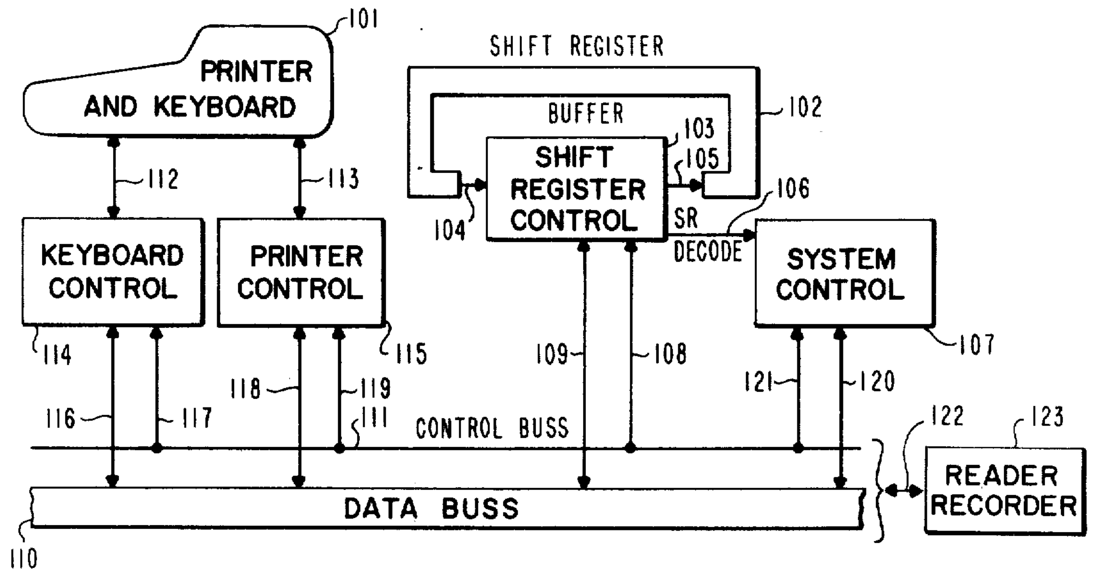
FIG. 1 is an overall block diagram illustrating the various control circuits utilized along with a typewriter buffer.

For a more detailed description of the invention, reference is first made to FIG. 1 wherein there is shown an input/output typewriter 101 in communication with a buffer 102 through controls 114 and 115. Buffer 102 is an electronic dynamic shift register and is controlled by the control logic, or shift register control 103. Control 103 receives the output from the output stage of buffer 102 along line 104 and provides an input to the input stage of buffer 102 along line 105.

The typewriter 101 is in two way communication with the keyboard control unit 114 along line 112 and with printer control unit 115 along line 113. Keyboard control 114 and printer control 115 are also in two way communication with the data bus 110 along lines 116 and 118, respectively. Data bus 110 is also in two way communication with the shift register control 103 along line 109 and the system control logic 107 along line 120. The data bus 110 can communicate, as indicated by arrows 122, with a bulk store, such as reader recorder 123. The control bus 111 is in two way communication with keyboard control unit 114 along line 117, printer control unit 115 along line 119, shift register control logic 103 along line 108, and system control logic 107 along line 121. System control logic 107 receives decoded data from shift register control 103 along line 106.

In the following description, the terms reader recorder and bulk store are meant to include recording media such as tapes, cards, discs, etc., and the associated structure for reading, writing and erasing data onto and from the recording media.

Implementation of the system in terms of each of the components illustrated in FIG. 1 can take any number forms which can be readily reduced to practice by those skilled in the art. For example, the teachings in U.S. Pat. No. 2,217,150 are pertinent to printer and keyboard 101, keyboard control 114, and printer control 115. Also, reference is made to U.S. Pat. No. 2,968,383. The teachings in U.S. Pat. No. 3,631,957 are pertinent to system control 107. The shift register control 103 is fully described hereinafter.

For purposes herein a hyphen can be either required or discretionary. When no means are provided for distinguishing between discretionary and required hyphens, the detection of a hyphen during output will cause output to be terminated for a hyphenation decision. If means are provided for distinguishing hyphens, then discretionary hyphen codes will be considered control codes, and required hyphens will be considered data codes. Each will be treated in accordance with the following description. Control codes include spaces, hyphens, deletes, tabs, backspaces, and carrier returns. Further, reference to measures, and left and right margins are to be considered synonomous. When output is through a printer or typewriter, the margins will be defined by the setting of margin stops. When output is to a bulk store, the measure will be defined in terms of a specified number of units which can correspond to the number of units between the left and right margin stops on a printer.

Broadly, reference to an input operation is to be taken as a write-over operation where, for example, text data codes are written over dummy codes. Insert operations include the insertion of data and control codes into the data flow, and delete operations include writing over data and/or control codes with delete codes. For insert operations the data flow is essentially expanded for inclusion of a data or control code. Output operations include the reading of data codes in the shift register memory and the writing of these data codes into a bulk store or the printout of these data codes with a printer.

When a rearrangement of memory during output is considered, revisions performed during an interruption of an output operation are also taken into account. That is, changes made during a revision operation will affect the rearrangement of memory for obtaining a correspondence of memory and output. In this respect, output can be the printing of a keyed character during a revision operation, or the printing of a character read from the memory during an output operation.

Figure 2:
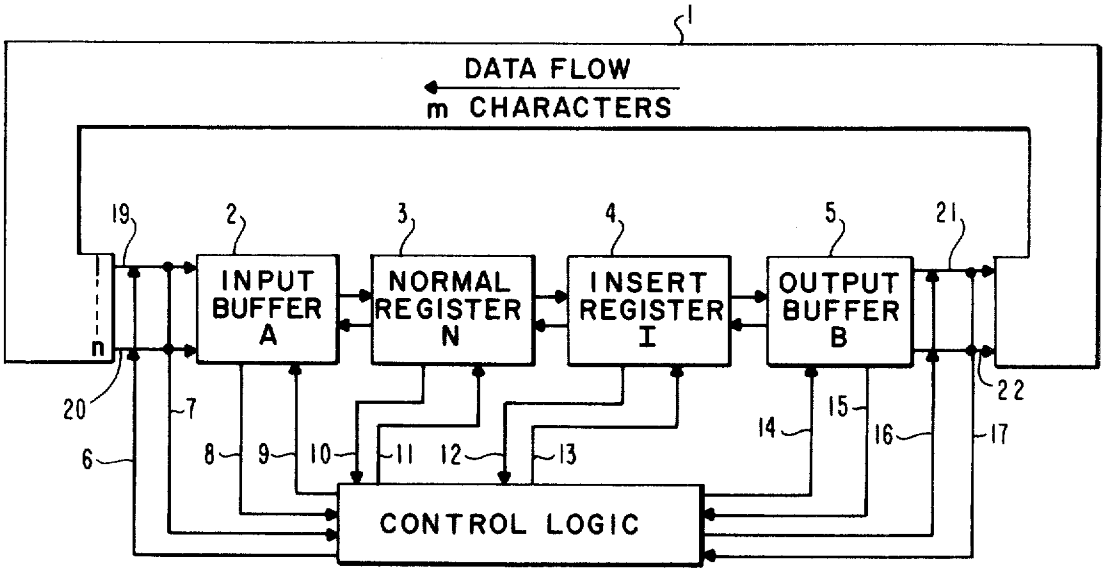
FIG. 2 is a generalized block diagram showing a shift register with certain buffers connected between its input and output stages which are controlled by a control unit to accomplish alteration of the data paths for the timewise shifting of the data for insertion or deletion of characters, flags, etc.

Reference is now made to FIG. 2 wherein there is shown a generalized block diagram of a system being part of the above system and employing four registers between the input and output stages of a shift register. The system of FIG. 2 is described in the above cross-referenced application Ser. No. 104,888, now U.S. Pat. No. 3,675,216. As shown, the shift register 1 is of $m$ characters in length and each character may be $n$ bits in width. The data as depicted moves in a counter-clockwise direction, and comes out of the final stage on lines 19 and 20 and is applied to an input buffer 2. This buffer, during the subsequent description of data flow, to simplify the description, is labeled A. Buffers and registers subsequently to be described are also designated with briefing characters N, I, and B. The output from the shift register is also applied along line 7 to the control logic unit and as shown the control logic unit can also apply data along line 6 to lines 19 and 20. In the subsequent description, while lines such as 6 and 7 are shown as single lines, it should be understood that there are actually as many lines as each character is wide. Input buffer 2 is also connected to normal register 3 and as shown can both provide data to normal register 3 and accept data from register 3 which is designated the N buffer. The input buffer 2 is also in two way communication with the control logic along lines 8 and 9 and as shown normal register 3 is likewise in two way communication with the control logic along lines 10 and 11. Further, as shown the normal register is in two way communication with insert register 4 which likewise is in two way communication along lines 12 and 13 with the control logic. Finally, insert register 4 is in two way communication with output buffer 5 which is also in two way communication along lines 14 and 15 with the control logic. Again, as shown the control logic is in two way communication with lines 21 and 22 along lines 16 and 17 which connect the input stage of the buffer to the control logic.

With this generalized block diagram, data flow is under the control of the control logic. The control logic as illustrated 1) takes the data from the output stage of the shift register and channels it into the appropriate register A, N, I, or B to control timewise shifting, 2) applies data to the input stage of the register along lines 21 and 22, 3) takes data from the output of any register, or 4) causes data to be applied to any shift register to accomplish any of the required functions associated with the task to be performed. The generalized flow of FIG. 2 is shown merely to illustrate that the contol logic accepts data from the various lines and buffers and channels the data to the appropriate register to cause insertion, deletion, etc., of characters.

Figure 3:
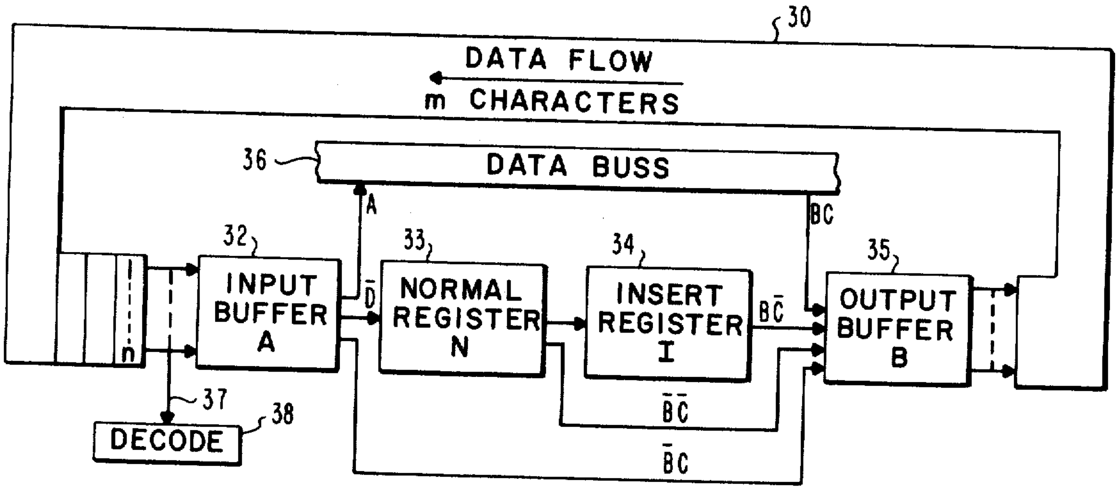
FIG. 3 is another block diagram illustrating the preferred embodiment of the subject novel shift register and control technique.

In FIG. 3 is shown a preferred embodiment of a system generally in accordance with the diagram of FIG. 2. The embodiment of FIG. 3 is much more efficient than the system of FIG. 2 in that the system of FIG. 3 does not directly control the data flow by bringing the characters into the control logic. Instead by selective actuation of four logical lines the embodiment in FIG. 3 can cause the completion of editoral tasks such as insertion of characters, deletion of characters, error correct backspace, and other functions normally found in revision systems.

As shown in FIG. 3, a shift register 30 has a data flow in the counter-clockwise direction such that the output of the shift register is applied to an input buffer 32 again labeled A. The output from the shift register is also applied along line 37 to a decode unit 38 which decodes the characters and provides an indication to the control logic, now shown, as to which characters are at the output of the shift register. The output from the input buffer A can be applied under logical control to line $\bar{B}C$ which causes the data to flow from input buffer A to an output buffer 35. Additionally, data from the input buffer 32 may be applied along line $\bar{D}$ to normal register 33.

Input buffer 32 is also, as shown, connected along line A to a data bus 36. Data bus 36 in turn is connected along line BC to the output buffer 35. The data bus is shown in general form and it's specific configuration will depend upon the type of apparatus connected to the shift register. That is, the data bus may in effect be the character output register and the input register of a typewriter. The normal register 33 is as shown connected along line $\bar{B}\,\bar{C}$ to the output buffer 35 and is also connected to the insert register 34. The insert register 34 is also connected along line $B\bar{C}$ to the output buffer 35. These various lines such as $\bar{B}\,\bar{C}$ are labeled in accordance with the logical control signals which must be applied to control the flow of the data along the designated path.

Figure 4:
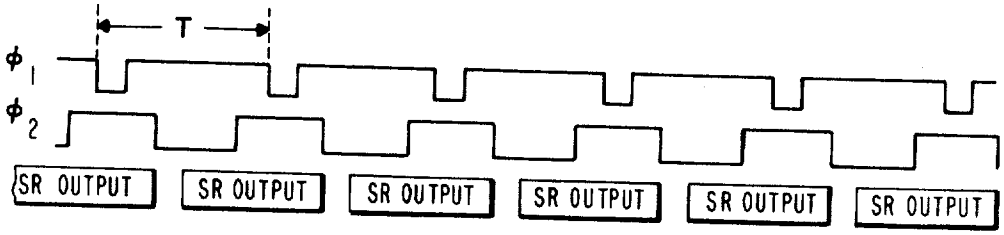
FIG. 4 is timing diagram illustrating the timing of the two phase clock employed which causes data to shift and be set in the register along with an illustration of the time of valid shift register output.

FIG. 4 shows the basic timing employed in the shift register system. Shown is the output of a two phase clock $\phi_1$ and $\phi_2$; T illustrates the cycle time. The falling edge of $\phi_1$ is used to set data into the various buffers while the falling edge of $\phi_2$ defines the output of data from the shift register. As shown the shift register output is not available for a short time following the falling edge of the $\phi_2$ clock.

Figure 5:
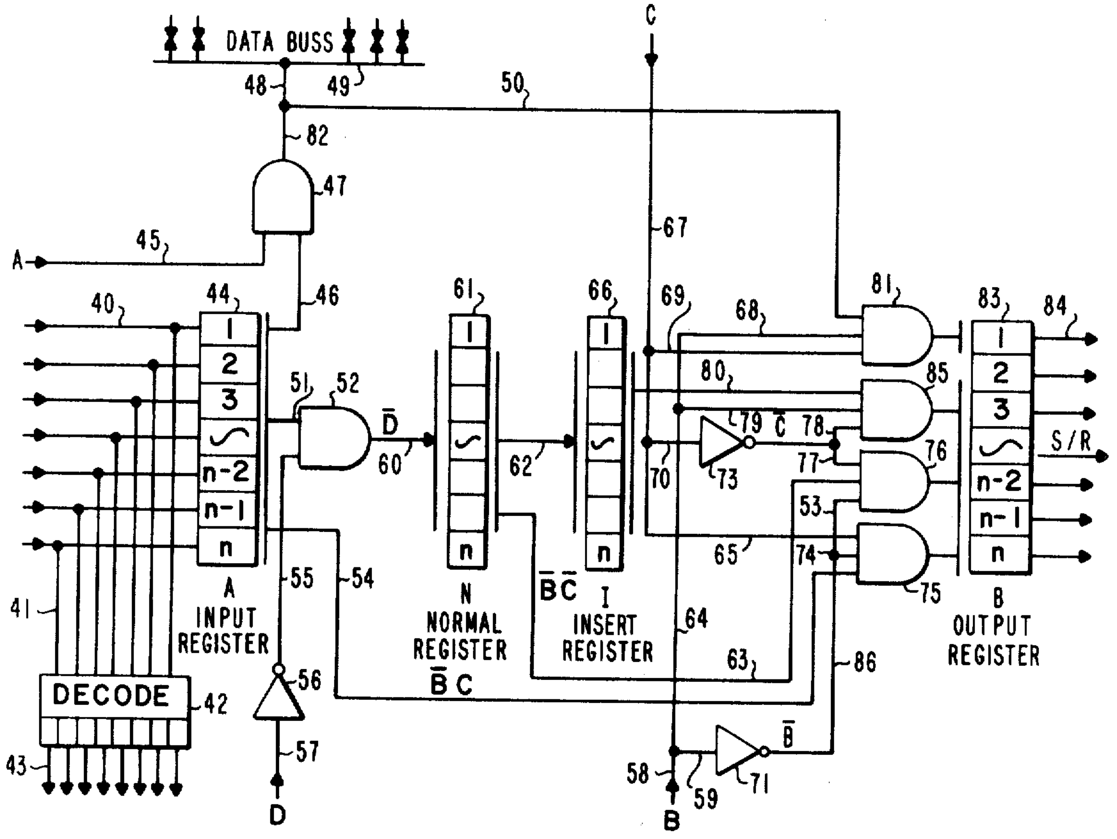
FIG. 5 is detailed drawing of the preferred embodiment of the shift register of FIG. 2.

For a more detailed description of the subject shift register and control technique, and for an operation description thereof, reference is made to FIG. 5. In FIG. 5 are lines 40 which represent the output lines from the output stage of the shift register and lines 84 which are connected to the input stage of the shift register. Lines 40 from the output stage of the shift register are applied to the input register 44. The input register 44 is as shown for *n* stages. The output from the shift register applied to lines 40 is also applied along lines 41 to the decode unit 42 which has its output applied along lines 43 to the control logic (not shown). As previously discussed, decode unit 42 decodes the characters appearing on the output lines 40 and provides decoded information to the control logic. More specifically, as will later become apparent, the characters decoded by decode unit 42 include dummy codes, delete codes, operation and record flags, etc.

The output from the input register 44 is as shown applied along line 46 to AND gate 47 which in turn receives the A logical input along line 45 from the control unit. Thus, application of a positive logic logical level to line 45 will cause the character appearing on line 40 to pass through AND gate 47 along lines 82 and 48 to the data bus 49. The data appearing on lines 40 is also applied along line 51 to AND gate 52 which receives another input along line 57 through inverter 56 and along line 55. Thus, application of a positive logical level to line 57 results in AND gate 52 inhibiting passage of data from the input register 44 onto line 60 and into the normal register 61. Application of a negative logical level or $\bar{D}$ to line 57, acting through inverter 56, causes line 55 to apply a positive logical level to AND gate 52 and thus allows the data from input register 44 to pass into normal register 61 along line 60.

The contents in the input register 44 are also applied along line 54 and to AND gate 75.

The contents of input register 44 which pass through AND gate 52 and along line 60 into the normal register 61 when a low logical level is applied to line 57 are applied along line 62 to the insert register 66. The same data also passes along line 63 to AND gate 76. The data in insert register 66 is also applied along line 80 to AND gate 85.

As shown, a C logical signal is applied along line 67 to lines 69, 70, and 65. Line 69 constitutes another input to AND gate 81, the signal applied to line 70 through inverter 73 is applied to both AND gates 85 and 76, and the signal applied along line 65 is applied to AND gate 75. Further, the B logical signal which is applied to line 58 is also applied along lines 64 and 79 to make up the third input to AND gate 85 and along lines 64 and 68 to make up the third input to AND gate 81. The B logical signal is also applied along line 59, through inverter 71, and along lines 86 and 74 to AND gate 75 and along lines 86 and 53 to AND gate 76. The output of AND gates 75, 76, 81, and 85 are applied to the output register 83 which is connected to the input lines 84 of the shift register.

Thus, from the above, it will be seen that application of a positive logical level to the D line 57 will result in the contents of the A input register 44 being inhibited from passing through AND gate 52 while application of low logical level or $\bar{D}$ signal to line 57 will cause the contents of the input register 44 to be passed through AND gate 52 to the normal register 61. Further, the contents of the normal register 61 always are applied to the insert register 66 and are selectively gated into AND gate 85 by application of a positive logical level to line 58 which is the B logical signal along with the application of a low logical level to line 67 which is the C logical signal.

Thus, unless the B signal is true and the C signal not true the data in insert register 66 will not pass through AND gate 85 to the output register 83.

In addition, as previously described, when the A logical signal is true, the data from the input register 44 is passed through AND gate 47 to the data bus. For input from the data bus 49, AND gate 81 gates data from the data bus 49 along line 50. This will occur as shown when the B and C logical signals are true. Futher, data can be gated directly from the normal register 61 along line 63 through AND gate 76 by application of the $\bar{C}$ signal to AND gate 76 in conjunction with the application of a $\bar{B}$ signal to line 58. The $\bar{B}$ signal is applied through inverter 71 is inverted to cause the conditions into AND gate 76 to be met to pass the information from the normal register 61 into the output register 83. Finally, data from the input register 44 can be passed directly along line 54 through AND gate 75 by application of a $\bar{B}$ signal to line 58 in conjunction with the application of a C logical signal. This will cause the data to pass directly from the input register 44 into the output register 83.

The normal data path that the data takes when there is no data manipulation involved in the flow of data from the output stage to the input stage of the shift register is along lines 40, 51, 60, 63, and 84 in FIG. 5. As shown the normal data flow is from the output stage of the shift register to the A register, then along the $\bar{D}$ path to the N register, and then, bypassing the insert register, along the $B\bar{C}$ path to the B register and then into the input stage of the shift register.

The shift register is first loaded by an input operation with dummy codes from the data buss and then control codes are input into the shift register and written over dummy codes. The control codes initially written into memory include record and operation flags. Thereafter, text data and other control codes are input into the shift register memory following the record and operation flags. The record flag defines the beginning of memory for output operations. The operation flag defines the position of the next character and the operating point in memory for output and revision operations.

For purposes of illustration, assume that an output measure is 50 units and the data flow in the shift register is — (DUMMY) (DUMMY) (RECORD) (OPERATION) (tab — 10 units) (100 unit text line — characters and spaces) (hyphen) (CR) (108 unit text line — characters and spaces) (CR) (102 unit text line — characters and spaces) (hyphen) (CR) (41 unit text line — characters and spaces) (CR) (CR) (tab — 10 units) (99 unit text line — characters and spaces) (CR) — (DUMMY) (DUMMY) —. It is obvious then that the data in the shift register will have to be revised in terms of location of carrier return and hyphen codes in order for the memory to correspond to the output format. For this data flow, it is to be assumed that the hyphens are discretionary. A first carrier return code will have to be inserted into the data flow within 50 units of the record flag. A second carrier return code will also have to be inserted into the data flow within 50 units following the first inserted carrier return code. If hyphenation decisions are not to be made and the measure is not to be overrun, then the first and second carrier return codes mentioned above can be inserted into memory exactly 50 units apart. In this case, after output to the end of the paragraph "(CR) (CR)" in the above data flow, the data flow in the shift register will be — (DUMMY) (DUMMY) (RECORD) (tab — 10 units) (40 unit text line — characters and spaces) (CR) (50 unit text line — characters and spaces) (CR) (50 unit text line — characters and spaces)(CR) (50 unit text line — characters and spaces) (CR) (50 unit text line — characters and spaces) (CR) (50 unit text line — characters and spaces) (CR) (11 unit text line — characters and spaces) (CR) (CR) (OPERATION) (tab — 10 units) (99 unit text line — characters and spaces) (CR) — (DUMMY) DUMMY) —.

The insertion of carrier return codes into the data flow is accomplished by applying positive logical signals to the B line 58 and C line 67 when the character to be followed by a new CR code is in the normal register. This character will then shift to the insert register and during this same shift time a CR code is gated to the output register from the data bus. Then a low logical signal is applied to the C line and the data flow will not be through the input, normal, insert and output registers.

The memory is then allowed to loop until the first dummy code is in the insert register. A low logical signal is then applied to the B line and the normal data path is restored.

When a CR code is detected during output and intermediate the left and right margins, it is to be removed or deleted, or written over with a space code. A write-over operation involving a space code can be accomplished by applying positive logic signals to the B and C lines when the CR code is detected in the normal register. A space is then gated to the output register from the data buss and written over the CR code. When the CR code is to be deleted from the data flow, it is either written over with a delete code or the data path in the shift register is altered for removing it. A write-over operation involving a delete code is accomplished in the same manner as described for writing over the CR code with a space code.

The removal of the CR code through altering the data path is accomplished by applying a low logical signal to the B line and a positive logic signal to the C line when the CR code is detected in the normal register 61. The data path will then be from the input register 44 to the output register 83 along line 54. The normal data path through the input, normal, and output registers is restored by applying low logical signals to the B and C lines when the first dummy code is detected in the input register.

The reasons for deleting a CR code from the data flow in one instance and writing over the CR code with a space in another instance relate to the position of the CR code. For example, if a CR code in the middle of a line follows a required hyphen, the CR code is to be deleted. If the CR code is between two words, it is replaced with a space.

Delete codes which exist in the data flow due to 1) the writing over of CR codes, or 2) revision operations, can be removed one at a time during each memory revolution if the system is not otherwise busy. The removal of delete codes from the data flow is accomplished by altering the data path as described above for the removal of CR codes.

Since an exact point-to-point correspondence between output and memory is to be obtained, delete codes existing in the data flow must be removed. As pointed out above, this can be readily accomplished. A point to note though, is that the time when this is allowed to occur can become very important. For example, the contents of the shift register can be "dumped" into a bulk store during one memory revolution. Therefore, there must be a sufficient delay before a dumping operation is permitted in order for all delete codes to be removed (flushed) from the data flow.

The above is not a particularly important consideration when output is through a conventional I/O typewriter. This is because the cycle time for each memory revolution closely approximates the print capabilities of the printer for each character. Therefore, there will in most cases be sufficient time to alter the data paths when an output operation is interrupted for a revision operation.

When discretionary hyphen codes are control codes, they can be handled in the same manner as CR codes. Also, operations are provided and described below where characters, words, and lines can be written over with delete codes. Further, accessing can be accomplished in terms of line, paragraph, and page in either the forward or reverse direction. The following discussion will be related to forward accessing by line and/or paragraph, and reverse accessing by line and/or page. This is for convenience and for reducing the number of oprator decisions in terms of depressing buttons. Also, the occurrence in the data flow of multiple CR codes is taken by the system as an indication of the end of a paragraph and/or the beginning of a new paragraph. As is obvious, these codes will not be affected during a rearrangement of memory. They will be used though for accessing as will page end codes occurring or inserted in memory. Page end codes are merely control codes indicating the end of a page of text. For further description of page end codes, reference is made to the above cross-referenced application, Ser. No. 214,369.

Figure 6:
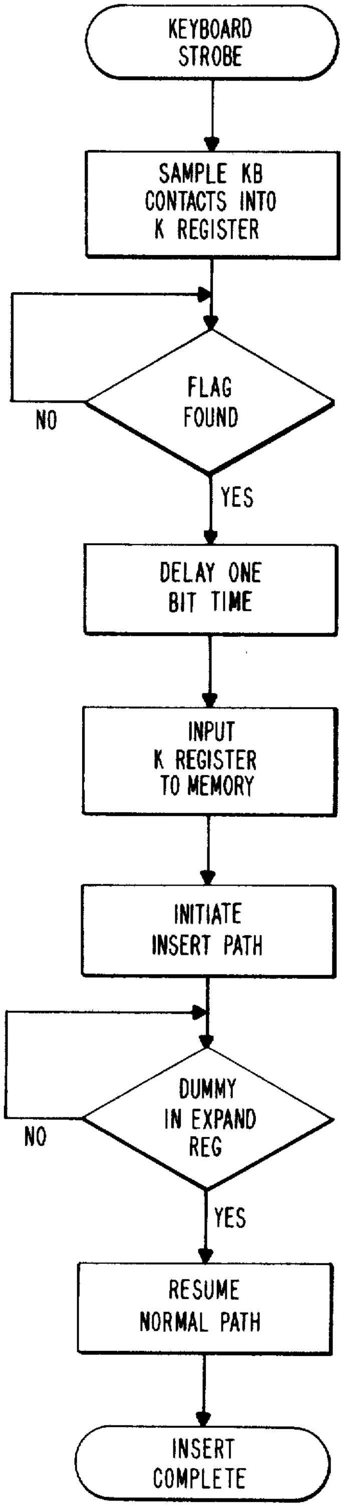
FIG. 6 is a flow chart illustrating the insertion of keyed characters into the shift register memory during a revision operation.

The flow taken by the system for rearranging the memory will first be discussed in relation to interrupting an output operation for revision purposes. Referring to FIG. 6, if characters are to be inserted into a line, they are keyed and stored in a register designated the K register. Thereafter, when the operation flag is detected in memory, the stored characters held in the K register are applied to the data bus and inserted into the data flow by altering the data path. The memory is then allowed to loop until a dummy code is detected in the insert (expand) register. At this time the data path is again altered for restoring the normal data path through the input, normal, and output registers. The use of the K register is for purposes of dumping a number of characters sequentially into the data flow during one memory revolution.

Figure 7:
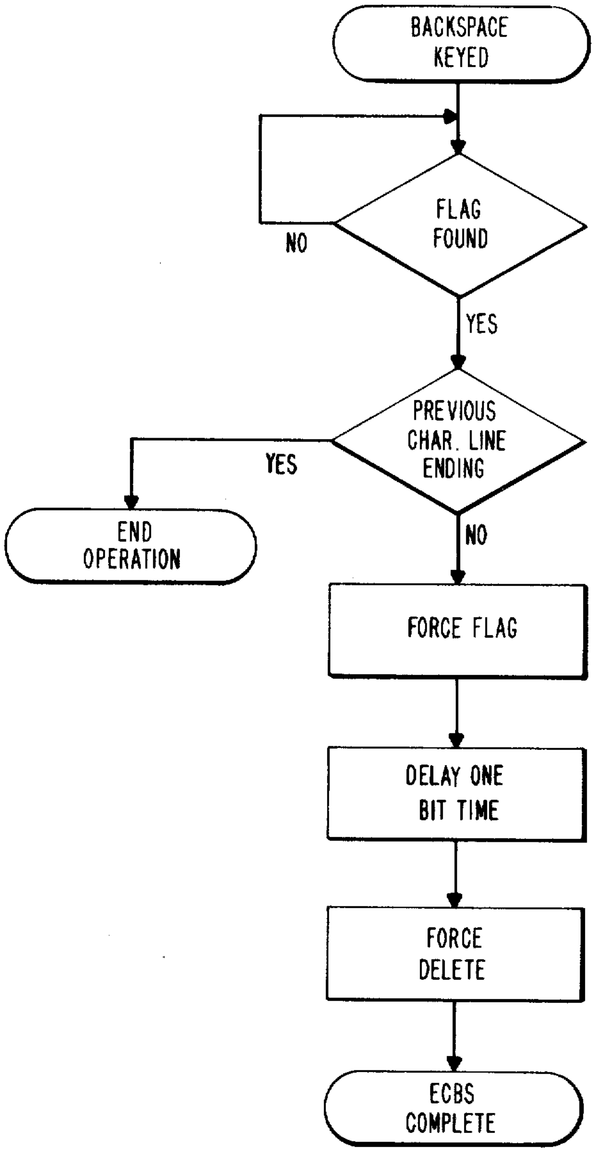
FIG. 7 is a flow chart illustrating an error-correct-backspace operation.

For a description of a revision and an error-correct-backspace operation, refer next to FIG. 7. A backspace is keyed on the keyboard and the operation flag in memory is sought. If the character preceding the operation flag in memory is a line ending code, such as a carrier return code, it is not to be removed or deleted. The operation is terminated and the operating point is not changed. If the character preceding the operation flag is not a carrier return code, a new operation flag is gated into memory from the data bus and written over the previous character. A delete code is then written over the old operation flag. At this time the error-correct-backspace operation has been completed and the operating point has been backed up one character.

Figure 8:
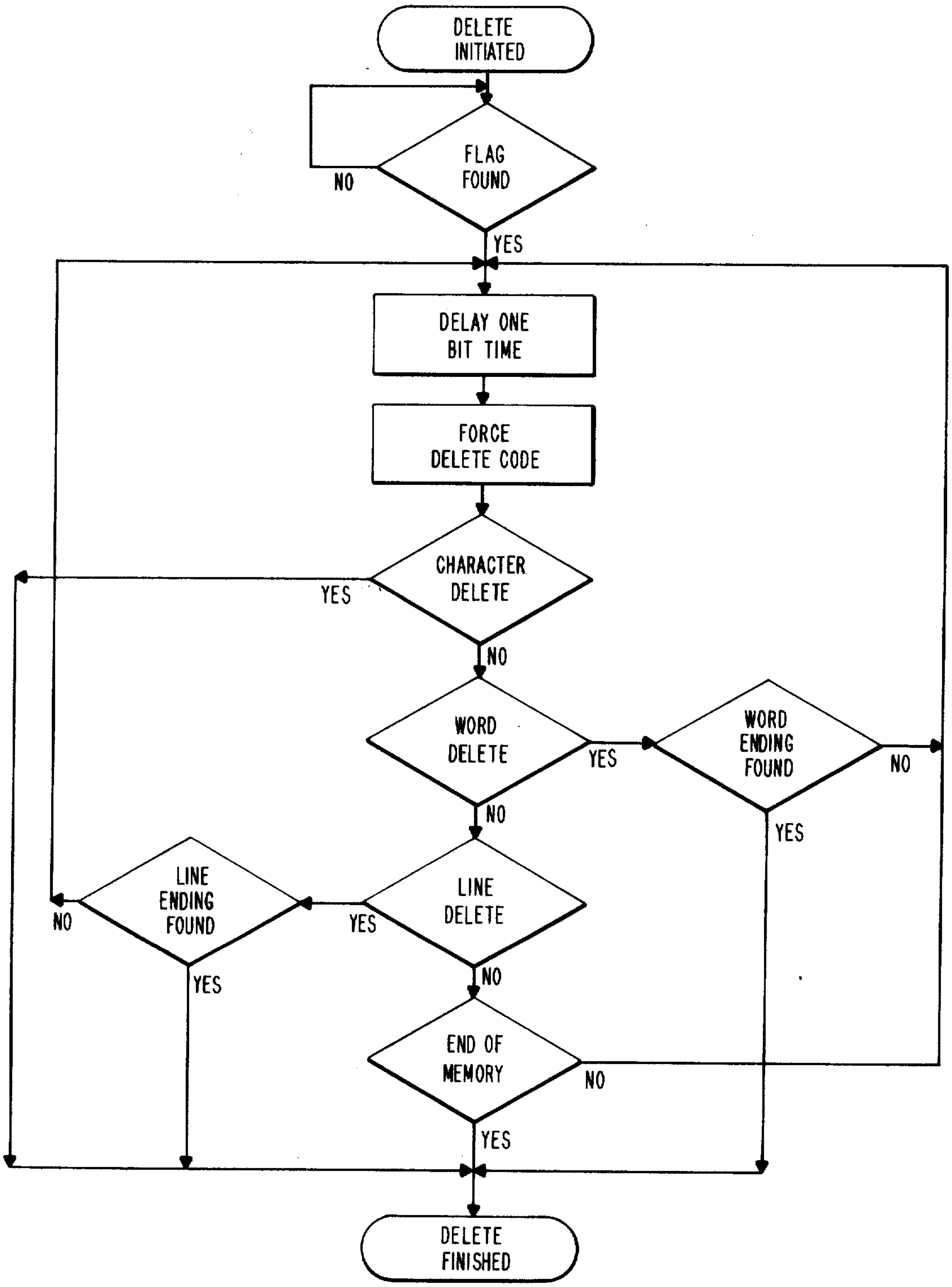
FIG. 8 is a flow chart illustrating a delete operation for deleting a character, a word, or a line.

In FIG. 8 is shown the flow taken by the system for performing a delete operation. After this operation is initiated the operation flag is sought. When found, a delete code is gated from the data bus and written over the character defined by (following) the operation flag. If only one character is to be deleted, the delete operation has been completed at this time. If a word is to be deleted, delete codes continue to be gated from the data bus and written over the characters until a word ending code, such as a space, is found. If the entire line is to be deleted, delete codes are written over each of the characters and spaces until a line terminating code (CR code) or an end of memory code (dummy code) is detected.

Figure 9:
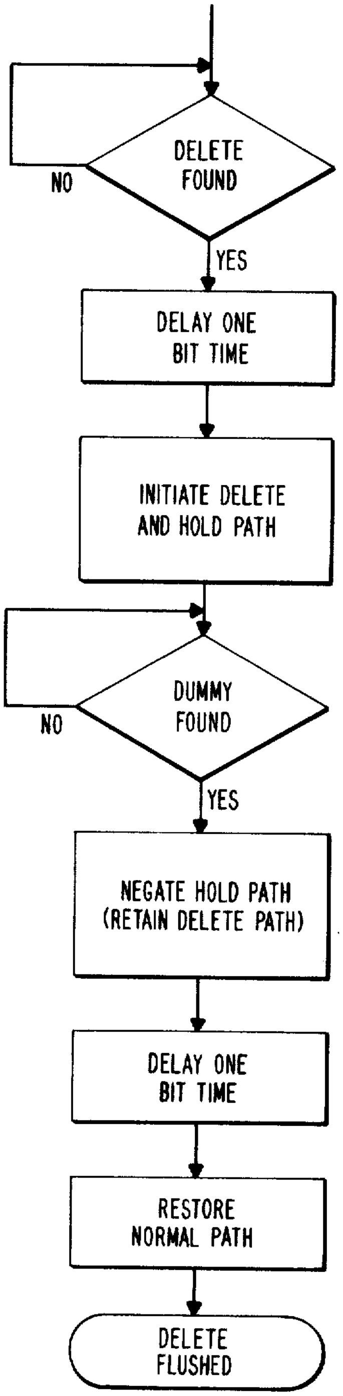
FIG. 9 is a flow chart showing the operation of removing delete codes which have been input into the data flow.

Refer next to FIG. 9 which illustrates the operation when delete codes existing in the data flow among text data characters are to be removed. A code is removed during each memory revolution by altering the data path in the shift register. When a delete code is detected in the input register, it is allowed to shift to the normal register and the data path is altered. The data path will now be from the input to the output registers. The delte code is now held in the normal register. Thereafter, when a dummy code is detected in the input register, a low logical signal is applied to the D line and the dummy code shifts both to the normal register and to the output register. During this shift the dummy code is written over the delete code held in the normal register. Thereafter, the normal data path is restored by applying a low logical signal to the C line.

Figure 10:
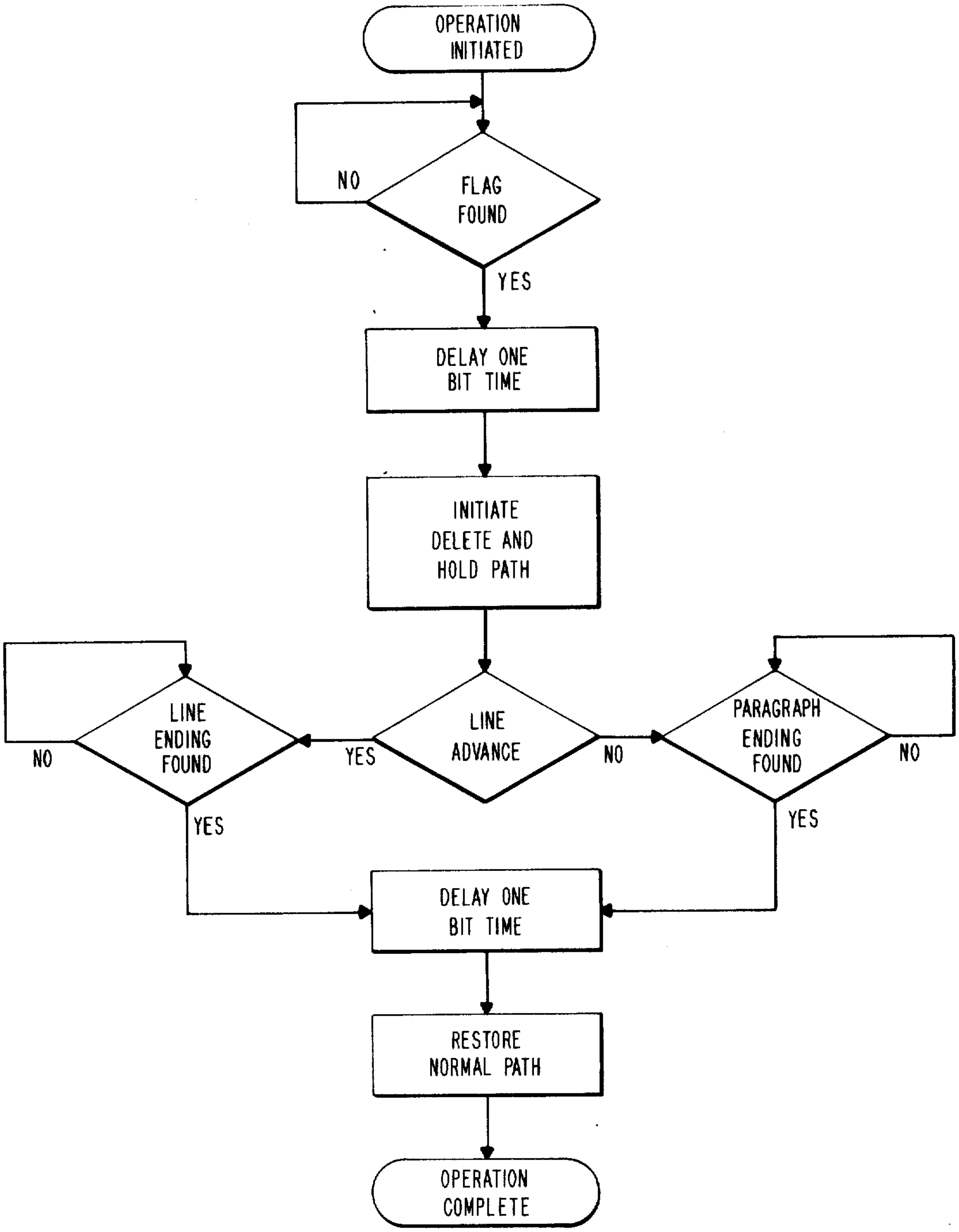
FIG. 10 is a flow chart illustrating a forward access operation where a subsequent line or paragraph beginning are detected.

Referring to FIG. 10, there is shown the flow taken when a forward access operation is initiated. The operation flag is sought and held by altering the data path. If the forward access operation is for advancing one line, a line ending (CR) code is sought. When the CR code is detected in the input register, it is allowed to shift to the output register. Then the normal data path is restored and a new operation flag is gated from the data bus and inserted into the data flow.

If the forward access operation is for advancing to the beginning of the next paragraph, a paragraph ending (CR CR) is sought. When found the codes denoting the paragraph ending are allowed to shift to the output register. Then the normal data path is restored and a new operation flag is inserted into memory.

Figure 11:
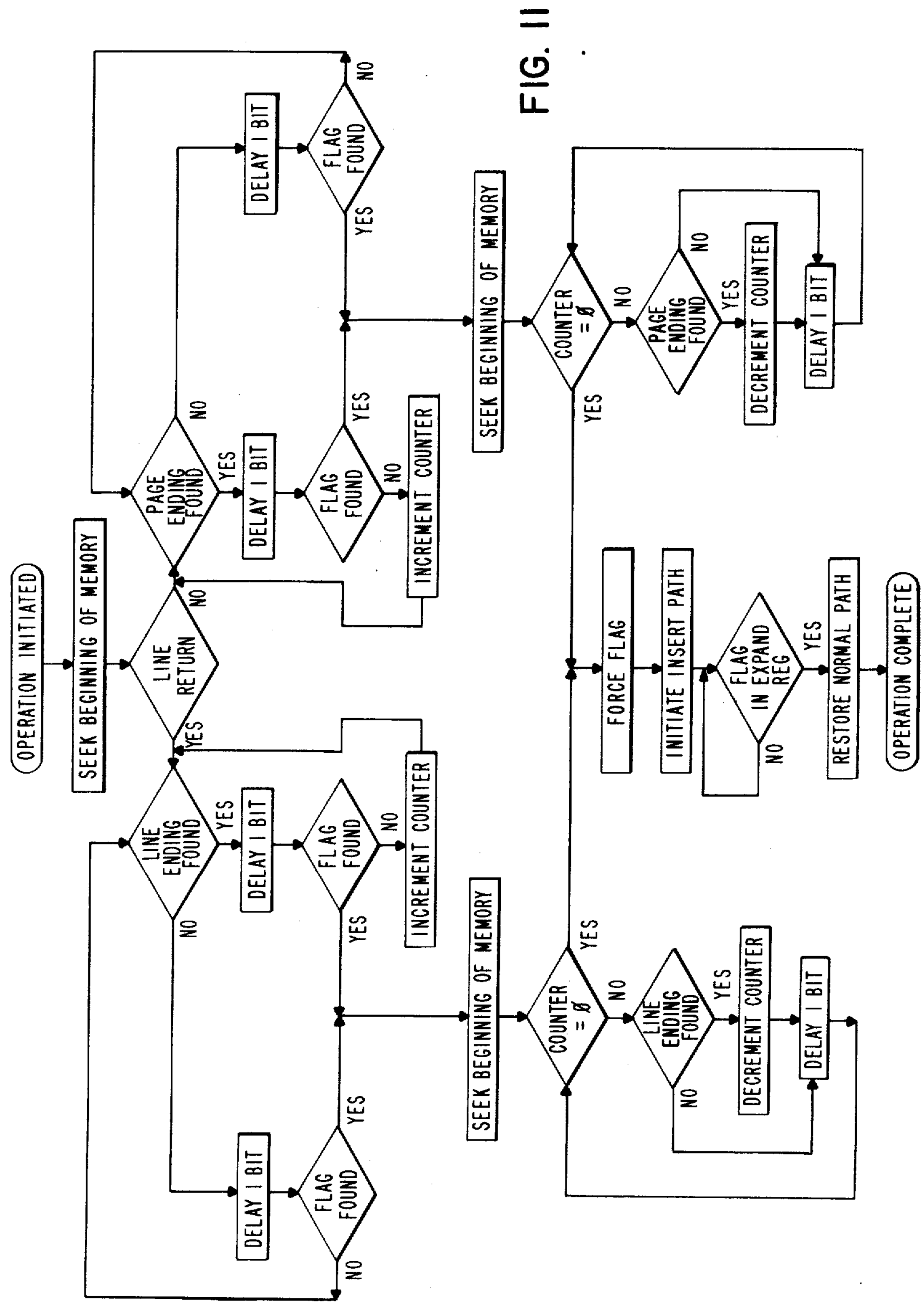
FIG. 11 is a flow chart illustrating a reverse access operation where previous line or paragraph beginnings are detected.

Referring now to the upper left portion of FIG. 11, there is shown the flow taken for performing a reverse access operation. The operating point is to be repositioned at the beginning of the line. The beginning of memory (record flag) is sought. The memory is allowed to loop and line ending codes (CR) are counted until the operation flag is detected. The beginning of memory is again sought and carrier return codes are counted until the previous count has been obtained (refer to lower left portion of FIG. 11). Then a new operation flag is inserted into the data flow (bottom center of FIG. 11). When the old operation flag is detected the data path is altered for removing it, and thereafter the normal data path is restored. Referring to the upper right portion of FIG. 11, there is shown the operation of repositioning the operating point at the beginning of the page. Again, the beginning of memory is sought and page end codes are counted until the operation flag is detected. The beginning of memory is again sought and page end codes are counted until the previous count is obtained (referring to the lower right portion of FIG. 11). Then as before, a new operation flag is inserted into memory (lower center of FIG. 11). The old operation flag is sought, the data path is altered for removing the old operation flag from the data flow, and then the normal data path is restored.

Figure 12:
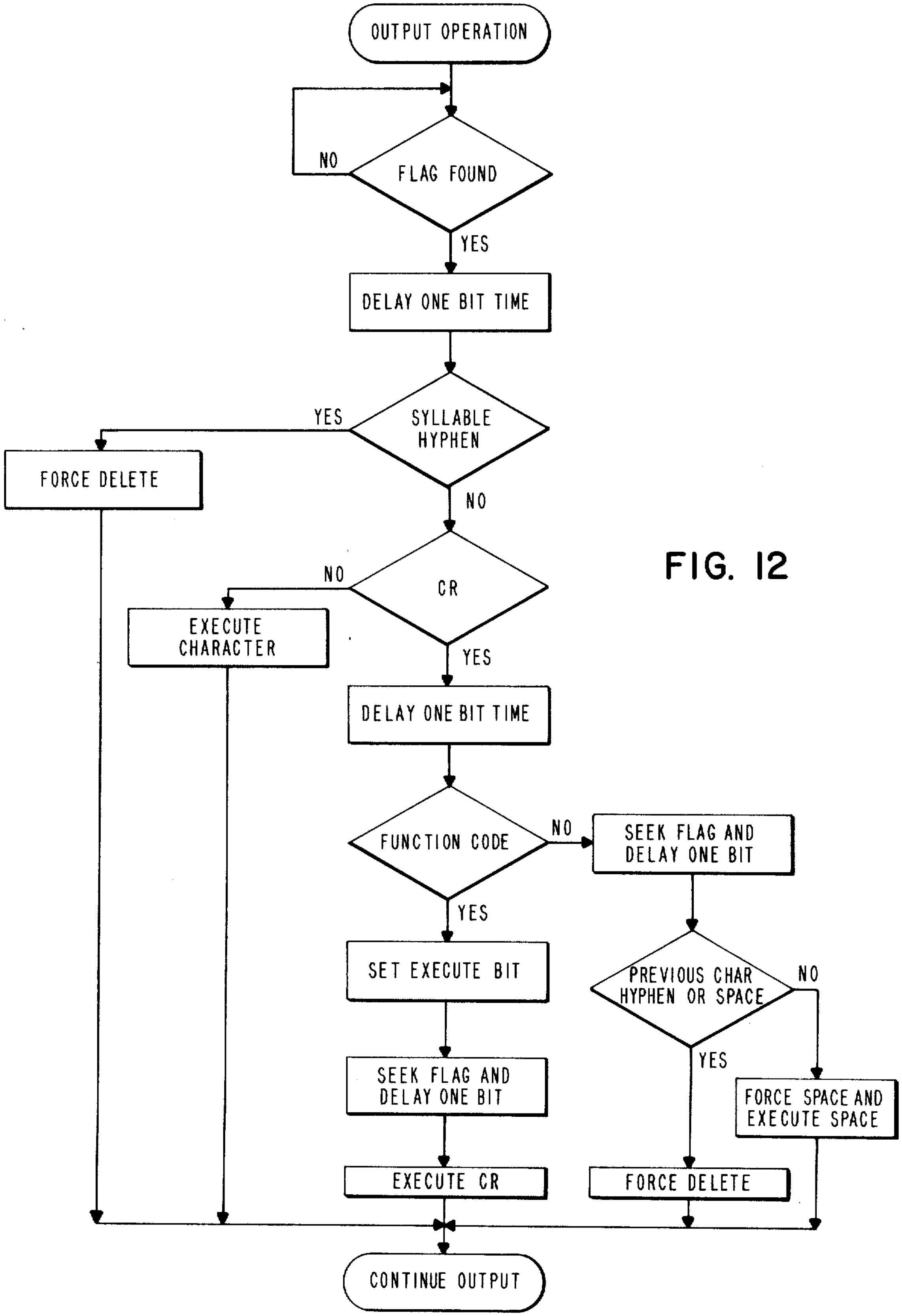
FIG. 12 is a flow chart illustrating the operation in the adjust mode when the output point is not in the hot zone.

For an adjust operation where the line endings are to be adjusted and the point of operation is not in the hot zone, reference is made to FIG. 12. An output operation is initiated and the operation flag is sought. If during output a syllable (discretionary) hyphen is detected before the line is to be ended, it is written over with a delete code and the output operation continues. If a carrier return code is detected and followed by a function code, (such as another CR code indicating the end of the paragraph), the carrier return operation is performed and output continues. If the code following the carrier return code is not a function code, a determination is made as to whether the previous character is a discretionary hyphen or a space. If the previous character is not a space or hyphen, a space is input and written over the CR code. If the character prior to the carrier return is a hyphen or a space, it is deleted by writing over the character with a delete code and the output operation continues.

As pointed out above, hyphens can be handled in a number of ways. One way would be to have different codes for the discretionary and required hyphens. Another would be for output to be terminated for an operator decision as to whether the hyphen is required or is discretionary. Yet another way of handling the situation would be for all hyphens detected to be deleted and later reinserted by the operator.

Figure 13:
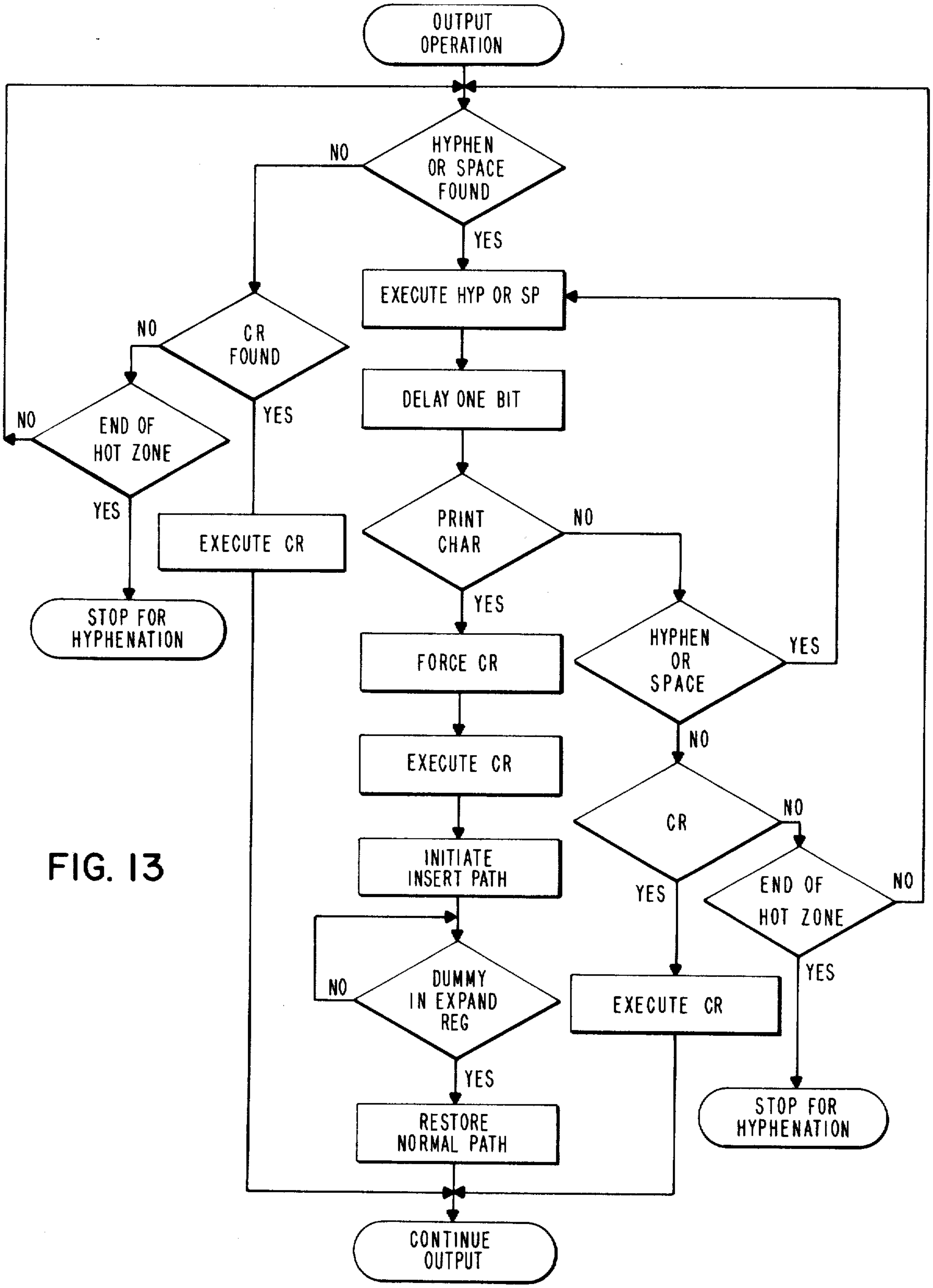
FIG. 13 is a flow chart illustrating operation in the adjust mode when the output point is in the hot zone.

If during an output operation the operating point is in the hot zone, the flow taken by the system is as shown in FIG. 13. A hyphen or space code detected in the hot zone will result in the printer executing the hyphen or space. If the next character code represents a print character, the data path is altered and a carrier return code is inserted into memory and executed by the printer. Thereafter, the normal data path is restored when a dummy code is detected in the expand (insert) register. If the code following the hyphen or space is not a print character, decision is made as to whether it is a hyphen or space code. If either, it is executed by the printer. If neither, a determination is made as to whether the code following the hyphen or space is a CR code. If not a CR code, a determination is made as to whether the end of the hot zone has been encountered. If the end of the hot zone has not been reached, the hyphen or space determination is again made (top of FIG. 13). If the end of the hot zone has been reached, the printer is stopped for a hyphenation decision. After the output operation is initiated, and a hyphen or space is not found in the hot zone (top of FIG. 13), a determination is made as to whether a carrier return code is in the hot zone. If a CR code is detected in the hot zone it is executed by the printer. If not, output continues until the end of the hot zone is detected. Then the printer is stopped for a hyphenation decision (left portion of FIG. 13). From the above, if neither a hyphen, space, or carrier return code are detected in the hot zone and the end of the hot zone is detected, the printer is stopped for a hyphenation decision.

Hot zone referred to herein is to be afforded its commonly accepted meaning. That is, a hot zone is an acceptable line ending portion of a measure. It can be a length of the measure adjacent the right hand margin where in the event a line ending code occurs, a carrier return operation will be initiated.

In summary, a buffer, which is a dynamic shift register, is in electronic association with a bulk store and an input/output typewriter. When the shift register has been loaded with data and control codes and an output operation is initiated, the memory is rearranged simultaneously with output. Revisions performed when output is interrupted also affect the rearrangement of memory. The rearrangement of memory will be in accordance with a selected line length determination and/or format. For a selected measure, stored lines will be adjusted for ending within permissable boundaries. That is, control and data codes are automatically input, inserted, and deleted in accordance with output requirements. For example, if a carrier return code is encountered intermediate the left and right margins during output, it is deleted or replaced with a space code. A similar situation is involved when a discretionary (syllable) hyphen is detected intermediate the left and right margins. It is also deleted or replaced with a space.

When the output operation is terminated, the data stored in the shift register will have been revised and rearranged. That is, the memory will be arranged at the end of an output operation as though it has been keyed and stored initially in accordance with the desired output format. In effect, a single storage means is involved which can be expanded or contracted for insertion and deletion. Continued and random updating is therefore possible due to the use of this expandable storage means.

With the system of this invention, the data is packed and after delete codes resulting from a revision operation have been removed from memory, an exact correspondence between memory and output is obtained.

While the invention has been particularly shown and described with reference to a particular embodiment, it will be understood by those skilled in the art that various changes in form and detail may be made without departing from the spirit and scope of the invention.

What is claimed is:

1. A method of automatically obtaining an exact point-to-point correspondence between the contents of an electronic storage means and an output format during output from said storage means to a data bus, said method comprising:

A. defining by a keyboard means an output format against which said storage contents, being a series in said storage means of data and control codes made up of n bits, are to be sequentially compared;

B. sequentially comparing said data and control codes with said output format; and C. altering the arrangement of said data and control codes, upon said comparing, when said storage contends correspond to said output format, by one of the following steps a. writing a new control code over an existing control code in said series to cause said arrangement to correspond to said output format, b. inserting a new control code into said series to cause said arrangement to correspond to said output format, and c. removing an existing control code from said series to cause said arrangement to correspond to said output format.

2. A method according to claim 1 further comprising defining a hot zone within said output format.

* * * * *

UNITED STATES PATENT OFFICE
CERTIFICATE OF CORRECTION

Patent No. 3,772,655 Dated November 13, 1973

Inventor(s) Robert G. Bluethman, Randell L. James

It is certified that error appears in the above-identified patent and that said Letters Patent are hereby corrected as shown below:

Column 14, line 2, the word "contends" should read --contents--. Column 14, line 2, the words "do not" should be inserted before "correspond".

Signed and sealed this 1st day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE 869-930